United States Patent
Bergström et al.

[19]

[11] Patent Number: 5,884,399
[45] Date of Patent: Mar. 23, 1999

[54] METHOD AND APPARATUS FOR REPAIRING THE CHASSIS AND OR BODYWORK OF AUTOMOTIVE VEHICLES

[75] Inventors: Hans Bergström, Blomstervägen 2; Lars Erik Nilsson, Stora Sundby; Bo Ingemar Andersson, Medåker, all of Sweden

[73] Assignee: Car-O-Liner AB, Kungsör, Sweden

[21] Appl. No.: 737,830

[22] PCT Filed: May 18, 1995

[86] PCT No.: PCT/SE95/00563

§ 371 Date: Nov. 20, 1996

§ 102(e) Date: Nov. 20, 1996

[87] PCT Pub. No.: WO95/32404

PCT Pub. Date: Nov. 30, 1995

[30] Foreign Application Priority Data

May 20, 1994 [SE] Sweden ............................... 9401768-8

[51] Int. Cl.⁶ ............................. B23Q 17/00; B23Q 3/00; G01D 21/00
[52] U.S. Cl. .................... 29/897.1; 29/407.1; 29/464; 33/608
[58] Field of Search ................. 29/897.1, 897.2, 29/407.1, 407.09, 464, 281.5; 269/303, 305; 33/288, 608

[56] References Cited

U.S. PATENT DOCUMENTS

| | | | |
|---|---|---|---|
| 4,165,567 | 8/1979 | Olsson | 33/608 |
| 4,275,872 | 6/1981 | Mullis | 269/77 |
| 4,891,889 | 1/1990 | Tomelleri | 33/608 |
| 5,131,257 | 7/1992 | Mingardi | 33/608 |
| 5,148,377 | 9/1992 | McDonald | 33/608 |
| 5,341,575 | 8/1994 | Chisum | 33/608 |
| 5,644,854 | 7/1997 | Bergeron | 33/608 |

FOREIGN PATENT DOCUMENTS

| | | |
|---|---|---|
| 0350089 | 6/1989 | European Pat. Off. . |
| 2922804 | 12/1980 | Germany . |
| 404244328 | 9/1992 | Japan .................................. 29/281.5 |

*Primary Examiner*—Paul T. Sewell
*Assistant Examiner*—Jila Mohandesi
*Attorney, Agent, or Firm*—Sughrue, Mion, Zinn, Macpeak & Seas, PLLC

[57] ABSTRACT

A method of repairing a vehicle chassis and/or vehicle bodywork which requires the replacement of a damaged vehicle part with a new vehicle part. The vehicle is clamped to a working bench and the new vehicle part (4), which is to be welded in position for instance, is held firmly in a correct position in relation to the vehicle (1) with the aid of bench-coacting holding devices (5, 18). The bench-coacting holding devices (5, 18) include positionally adjustable means (10, 17) which are intended to coact with specific points of the new vehicle part, the positions of these points in space relative to the vehicle being known. In this regard, the positions in space of the positionally adjustable means are set with the aid of separate measuring equipment. The invention also relates to an arrangement for use when carrying out the method.

8 Claims, 3 Drawing Sheets

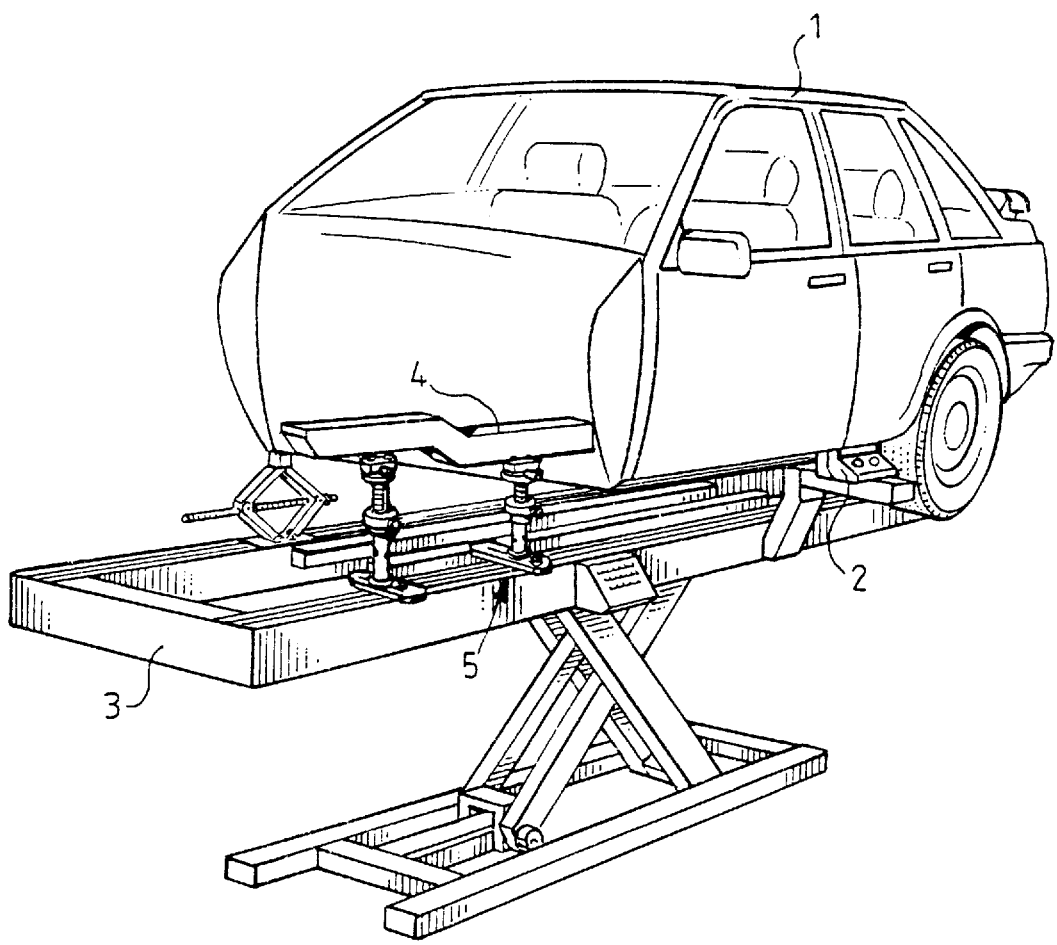

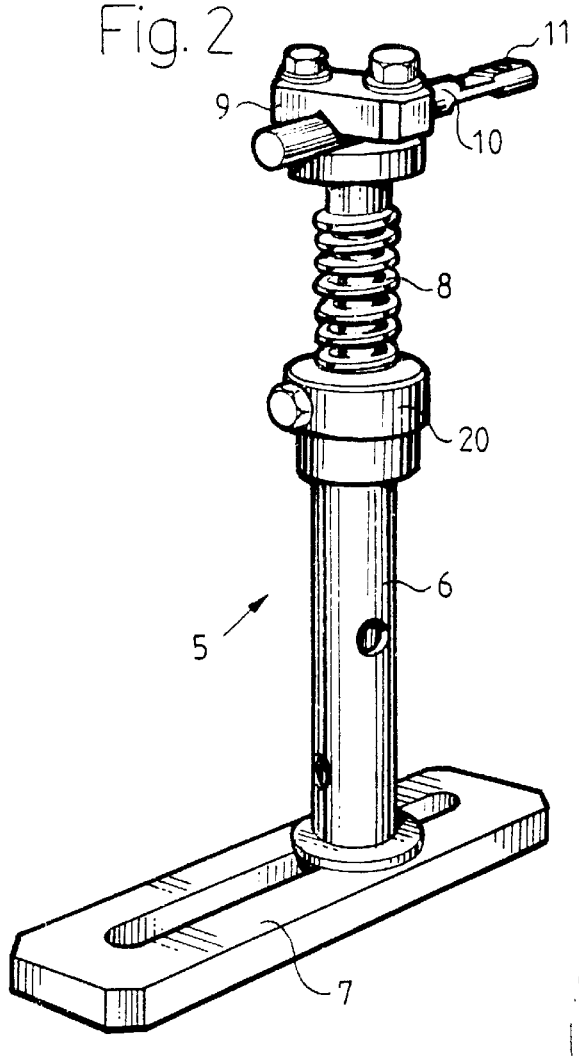
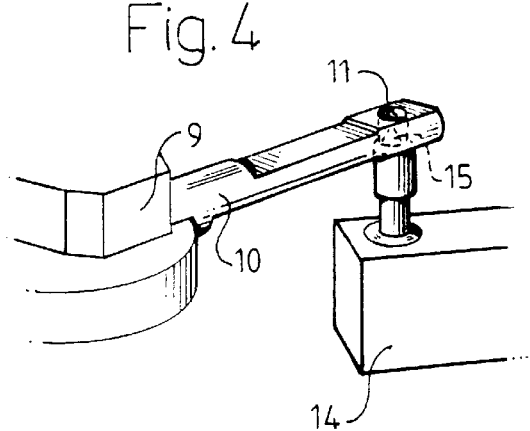
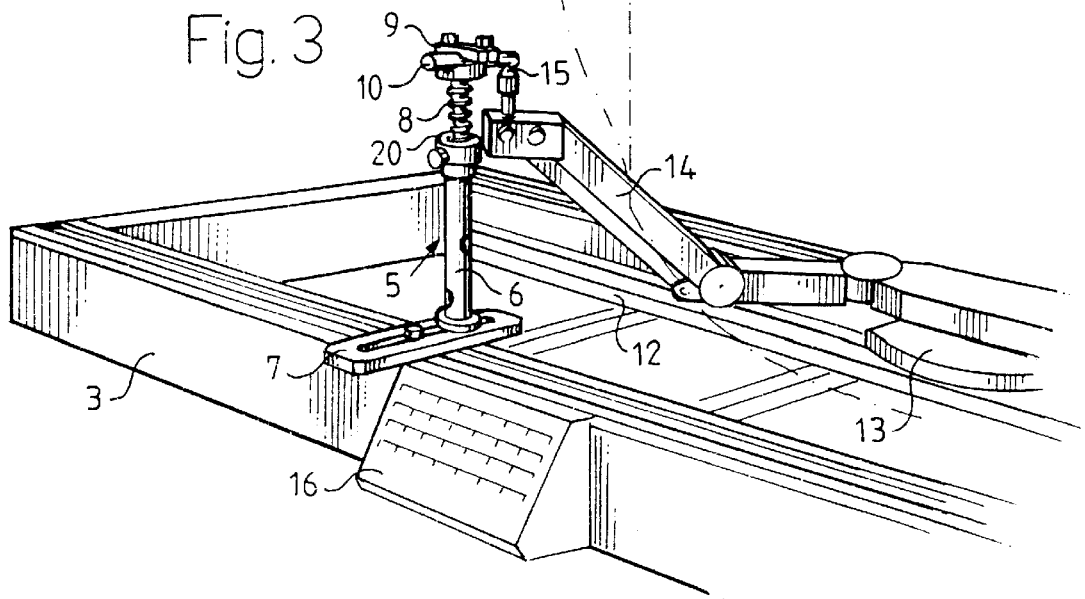

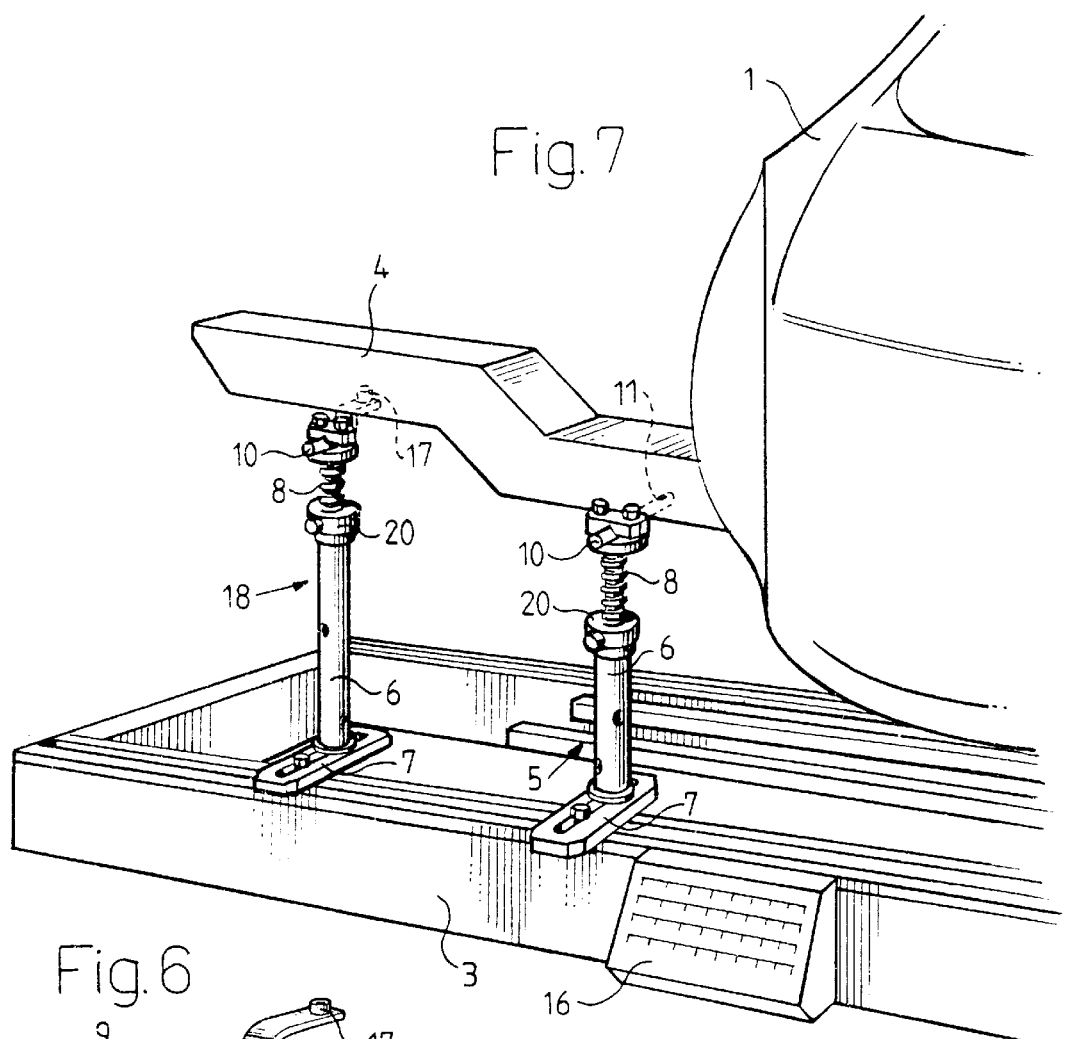
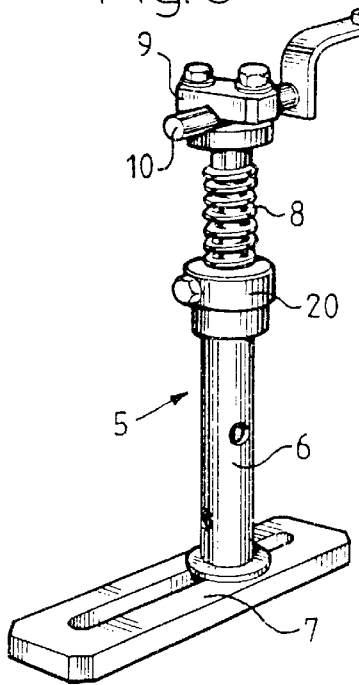
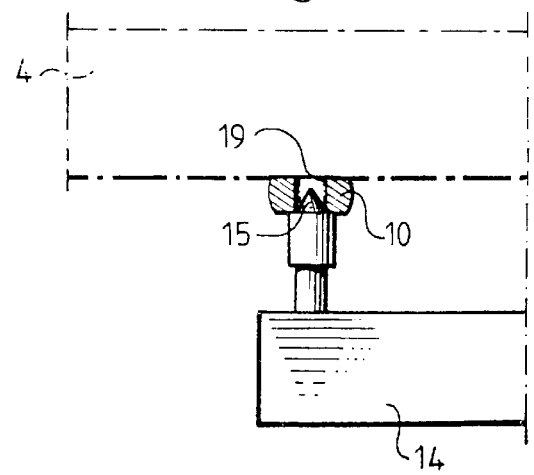

METHOD AND APPARATUS FOR REPAIRING THE CHASSIS AND OR BODYWORK OF AUTOMOTIVE VEHICLES

The present invention relates to a method and to apparatus for repairing the chassis and/or the bodywork of damaged automotive vehicles and then particularly for making repairs which require the replacement of damaged vehicle parts with new parts.

When fitting a new part adjacent an undamaged or truly aligned part of a vehicle which has been partially demolished as a result of an accident for instance, or when replacing rust-damaged parts, the final result is totally dependent on the new part being held in precisely the correct position in relation to the remainder of the vehicle when fitting said part, for instance when welding the part in place.

Data sheets which define the positions of the different points of the chassis and/or the bodywork of car in a space coordinate system are available for the majority of makes of private vehicles. The measurement points used may have the form of holes, flat surface parts, pins or equivalent devices.

A damaged vehicle is aligned by clamping the vehicle onto a drawing or aligning bench. The bench includes measuring equipment which can be moved along the bench. The measuring equipment is used initially to measure or determine the locations of from three to five undamaged points of the car, so as to define the position of the car accurately and precisely in relation to the measuring equipment. The car is then aligned, for instance by a pulling action, until remaining measuring points on the car coincide with corresponding values on the data sheet.

When welding a new part to a car in replacement for a removed part, it is known to clamp the new part in its correct position in space while using reference points on the part. The replacement part is held by holding devices which can be clamped firmly to the aligning bench and which consists in a large number of component parts that can be assembled together and the dimensions and angles of which are known. When wishing to position, for instance, a pin in a correct position in space for coaction with a reference hole on a new car part, there is chosen from a kit of fixed component parts those parts which when combined and fitted in a chosen position on the aligning bench will result in an external pin being located in the desired position.

However, if the component parts have not been manufactured with any great precision or have been damaged or have become worn, the individual discrepancies of each separate component part are likely to add together so that the final position of the external pin will be totally wrong.

It is also difficult to carry out quality checks, since such checks require the inspection of each separate detail of the entire fixture set-up.

Adjustable holders provided with scales or holes have also been used earlier, although such devices give the same uncertain results as those described above.

The main object of the present invention is to provide a method of the kind defined in the introduction which can be applied readily and which eliminates the aforesaid drawbacks and which will also produce a result of high quality which is not impaired with time.

The invention is based on the realization that this object can be achieved when instead of a large number of fixed components, there is used a few components which can be adjusted in different respects and therewith adjust the position of the final element which coacts with, e.g., a new chassis part with the aid of separate measuring equipment of the same kind as that used when aligning the chassis of a car.

Thus, the present invention provides a method of repairing a vehicle chassis and/or vehicle bodywork in which damaged parts are replaced with new parts, wherein the vehicle is clamped securely to a working bench and a new vehicle part to be fitted, for instance to be welded, is held firmly in a correct position relative to the vehicle with the aid of bench coacting holding devices which can be locked in relation to the bench and which include positionally adjustable means for coaction with specific points on the new vehicle part, the positions of these points in space relative to the vehicle being known. The inventive method is characterized by using separate measuring equipment when adjusting the positions of said positionally adjustable means in space.

The inventive method thus enables a new vehicle part to be positioned with absolute precision in space irrespective of any damage to or wear on the holding devices used, as the position of the new vehicle part is determined with the aid of the measuring equipment and not in dependence on dimensions, positions and angles of apparatus components. The method of procedure can be repeated any number of times with the same setting precision, since the measuring system can be checked in accordance with prescribed quality standards and adjusted when necessary.

Other characteristic features of the inventive method and the characteristic features of an arrangement for use when carrying out the method will be apparent from the following claims.

The invention will now be described in more detail with reference to an exemplifying embodiment thereof and also with reference to the accompanying drawings, in which FIG. 1 is a schematic illustration of a car clamped to an aligning bench and a new chassis component firmly held in relation to the car;

FIG. 2 illustrates a holding device which is intended to hold the new chassis component shown in FIG. 1 and which includes one type of position adjusting means;

FIG. 3 illustrates the positional setting of the position adjusting means shown in FIG. 2;

FIG. 4 is an enlarged view of part of the FIG. 3 illustration;

FIG. 5 is an enlarged view of part of the FIG. 4 illustration;

FIG. 6 illustrates a holding device according to FIG. 2 provided with another type of position adjusting means; and FIG. 7 illustrates the use of the holding devices shown in FIGS. 2 and 6 for adjusting the position of a new chassis component.

FIG. 1 illustrates a car 1 from which badly damaged parts have been removed. The car is affixed to a raisable and lowerable working bench 3 by means of clamps 2. Although not shown, the bench may be provided with means for aligning the car chassis, for instance in the form of chains and clamping devices. As mentioned in the introduction, a car chassis is aligned with the aid of pre-established reference points on the car chassis and bodywork. The positions of these reference points are checked with the aid of accurate measuring equipment, and the car is aligned until the positions of the reference points coincide with the pre-established positions of said points, these positions normally being established from a data sheet supplied by the car manufacturer. The fixed position of the car 1 on the bench 3 is determined by establishing the positions of 3–5 reference points on undamaged parts of the car with the aid of the measuring equipment. This procedure will calibrate the measuring equipment, which can then be moved along a given path in relation to the bench 3 and the subsequent measuring operations are effected in relation to these reference points.

When fitting a new part to the car, for instance a new chassis beam 4, it is imperative that the beam is held precisely in position prior to being fitted, e.g. welded. To this end, there are used holding devices 5 which coact with reference points on the beam 4, the positions of these reference points being known in relation to remaining reference points on the car 1.

One embodiment of such a holding device 5 is shown in FIG. 2, from which it will be seen that the device includes a tubular stanchion 6 which is mounted in a foot plate 7 such as to enable the stanchion to be adjusted between different lateral positions, said foot plate 7, in turn, being movable along the bench 3, as evident from FIG. 3 for instance. The stanchion 6 receives a threaded spindle 8 which coacts with a nut 20 on the stanchion. The nut 20 is suitably of the kind which will enable quick adjustments to be made by virtue of an axial movement with no thread engagement, and which will also enable fine adjustments to be made by virtue of engagement between the spindle threads and corresponding thread on the nut 20. The spindle 8 carries a head 9 which functions to clamp a selected positionally adjustable device. In the case of the FIG. 2 embodiment, this device has the form of a vehicle-part supporting rod or bar 10 which can be moved in the direction of its longitudinal axis and which includes an outer hole 11 intended for coaction with an accurately determined reference point, such as a pin or peg which serves as a reference point for the new part of the car chassis.

Before supporting the new vehicle part on the rod 10, it is necessary to first bring the hole 11 into a precise and correct position. As illustrated in FIG. 3, this is effected in accordance with the invention with the aid of known measuring equipment used when aligning the car chassis and comprising a slide 13 which can be moved along rails 12. The slide 13 carries a multi-part pivotal measuring arm 14 which is provided, among other things, with sensing means which sense the angular positions of rotation of the different pivot axles, so as to enable the exact position of a measuring probe 15 in a space coordinate system to be determined. In the illustrated case, the probe is in the form of a cone. The measuring equipment also includes an electronic display unit 16 on which the precise position of the measuring probe 15 in space is presented, among other things. Measuring equipment of this kind is marketed under the name Car-O-Tronic by Car-O-Liner AB, Kungsör, Sweden, and will not therefore be described in more detail here. However, the invention can also be applied with the aid of other measuring systems which enable the position of, e.g., the hole 11 in the rod or bar 10 to be determined exactly, such that this position can be set in agreement with the desired position of that reference point on the new chassis part with which said hole shall coact.

FIGS. 4 and 5 illustrate in more detail how the cone 15 on the measuring arm 14 coacts with the hole 11 when adjusting the rod or bar 10 precisely to the desired position. Subsequent to this adjustment, the bar 10 is intended to support the new chassis part, e.g. the beam 4, as illustrated schematically in FIG. 5 in chain lines. The measuring arm 14 and the cone 15 are therewith removed, so as to enable a reference pin 19 on the beam 4 to enter the hole 11 on the bar 10.

In order to correctly position the new chassis part, such as the beam 4, it is necessary for at least the position of one positionally adjustable device, such as the rod or bar 10, to be determined in this way for coaction with a reference point on the new chassis part. As illustrated in FIG. 7, it is often necessary to determine two or more support points on the new chassis part and to fix these support points in relation to the remaining part of the car 1. In the case of the FIG. 7 embodiment, two identical holding devices are used to this end, the only difference being that the rod or bar 10 of the additional holding device 18 carries an angle iron which is provided with an upstanding pin 17 instead of a hole 11, this pin being intended to coact with a reference hole in the new chassis beam. As will be understood by the person skilled in this art, other types of support elements having accurately defined contact surfaces for engagement with a chassis reference point may be used.

The holder devices 5, 18 used in accordance with the invention can be moved in the longitudinal direction of the bench 3 and adjusted transversely in relation thereto. The threaded spindle 8 also enables the holding devices to be adjusted vertically, and the rods or bars 10 can be adjusted in their longitudinal direction for exact positioning of their reference elements, which in the illustrated embodiments consist in the hole 11 and in the pin 17 respectively.

The present invention enables these reference elements 11, 17 to be positioned precisely in space without needing to rely upon scales or on the setting positions of the different components included in the holding devices. Thus, the accuracy of the settings is not dependent on manufacturing tolerances of these components and will not be affected by any damage thereto or wear thereon. The same holding devices, including only a few components, can also be used with different types of cars.

The invention also enables the reference points of, e.g., a beam on one side of the car to be correctly positioned in relation to corresponding points on a beam on the other, undamaged side of the car without using data sheets showing desired positions. In this regard, it is only necessary to first measure the points on the undamaged side of the vehicle with the aid of the measuring equipment to establish the positions of those points located symmetrically with the points on the other side of the car. Among other things, this can be highly beneficial in the case of unusual car models or when repairing cars for which no data sheet is available. Moreover, the operator himself is able to determine which of the reference points shall be used and how many.

Although the invention has been described above with reference to a preferred embodiment thereof illustrated in the accompanying drawings, it will be understood that various modifications can be made within the scope of the following claims. For instance, the illustrated holding devices and the illustrated measuring equipment can be modified in accordance with different requirements as dictated by practical circumstances. The measuring equipment may, for instance, include an optical laser system or an acoustic system, the measuring points being marked in a way applicable to the measuring system applied.

We claim:

1. A method of repairing a vehicle chassis and performing vehicle bodywork requiring the replacement of damaged vehicle parts with new vehicle parts, comprising the steps of:

clamping a vehicle to a work bench, holding a new vehicle part to be fitted firmly in a correct position, in relation to the vehicle, with the aid of bench-coacting holding devices which can be locked firmly in place in relation to the bench, and setting a positionally adjustable means in coaction with specific points of the new vehicle part, the positions of the specific points in space relative to the vehicle being known, wherein the positions in space of said positionally adjustable means are set with the aid of a separate measuring equipment.

2. A method according to claim 1, further comprising the step of:

calibrating the measuring equipment on the basis of reference points on the vehicle clamped to the bench.

3. A method according to claim 1, farther comprising the step of:

bringing a measuring probe of the measuring equipment successively into contact with said positionally adjustable means when adjusting said means to correct positions.

4. An apparatus for use when repairing the chassis and performing bodywork on a vehicle, wherein damaged vehicle parts are replaced with new vehicle parts, said apparatus comprising:

a work bench (3), clamping devices (2), for clamping the vehicle (1) to the bench, and bench-coacting holding devices (5; 18), which can be locked firmly in place in relation to the bench and which fiction to hold a new vehicle part (4) to be fitted to the vehicle in a correct position relative to said vehicle, wherein the holding devices include positionally adjustable means (10, 11, 17) adapted for coacting with specific points on the new vehicle part whose positions in space relative to the vehicle (1) are known, and separate measuring equipment (13–16) for adjusting the positionally adjustable means (10, 11, 17) to desired positions in space.

5. An apparatus according to claim 4, characterized in that the measuring equipment includes a movable measuring arm (14) having a measuring probe (15) which is intended to be brought successively into contact with the positionally adjustable means (10, 11, 17) for adjusting said means to their correct positions.

6. An apparatus according to claim 5, characterized in that the measuring arm (13, 14) is movable along the work bench (3) on bench-mounted rails (12).

7. A process according to claim 1, wherein the measuring equipment is connected to the work bench, such that all reference points of the vehicle and the replacement parts are measured by a common space coordinate system based on the work bench.

8. An apparatus according to claim 4, wherein the measuring equipment is connected to the work bench, such that all reference points of the vehicle and the replacement parts are measured by a common space coordinate system based on the work bench.

* * * * *